United States Patent [19]

Lessway

[11] Patent Number: 4,650,237
[45] Date of Patent: Mar. 17, 1987

[54] AUTOMATIC CENTERING AND GRIPPER APPARATUS

[75] Inventor: Richard J. Lessway, Farmington Hills, Mich.

[73] Assignee: Arobotech Systems, Inc., Warren, Mich.

[21] Appl. No.: 759,093

[22] Filed: Jul. 25, 1985

[51] Int. Cl.⁴ ............................................. B25J 15/08
[52] U.S. Cl. ................................ 294/119.1; 82/38 R; 294/88; 294/902; 901/37; 901/39
[58] Field of Search ................. 294/86.4, 88, 93, 94, 294/106, 115, 116, 119.1, 902, 103.1; 51/103 R, 103 WH, 238 S; 82/38 R, 39; 269/32, 34; 409/165; 901/30-39

[56] References Cited

U.S. PATENT DOCUMENTS

| | | | |
|---|---|---|---|
| 4,399,639 | 8/1983 | Lessway | 51/238 S |
| 4,518,187 | 5/1985 | Blatt et al. | 294/88 |
| 4,546,681 | 10/1985 | Owsen | 82/39 |

FOREIGN PATENT DOCUMENTS

| | | | |
|---|---|---|---|
| 22659 | 2/1979 | Japan | 294/103.1 |
| 384773 | 9/1973 | U.S.S.R. | 294/106 |
| 632547 | 11/1978 | U.S.S.R. | 294/88 |
| 795942 | 1/1981 | U.S.S.R. | 294/88 |

Primary Examiner—Johnny D. Cherry
Attorney, Agent, or Firm—Robert G. Mentag

[57] ABSTRACT

An automatic centering and gripping apparatus which includes a housing in which is slidably mounted a longitudinally movable operator body. A pair of gripper arms are slidably mounted on the operator body. Each gripper arm carries a gripper member engageable with a workpiece. The gripper members are moved longitudinally and laterally into gripping engagement with a workpiece when the operator body is moved in one longitudinal direction, and they are correspondingly disengaged from the workpiece when the operator body is moved in the other longitudinal direction.

10 Claims, 20 Drawing Figures

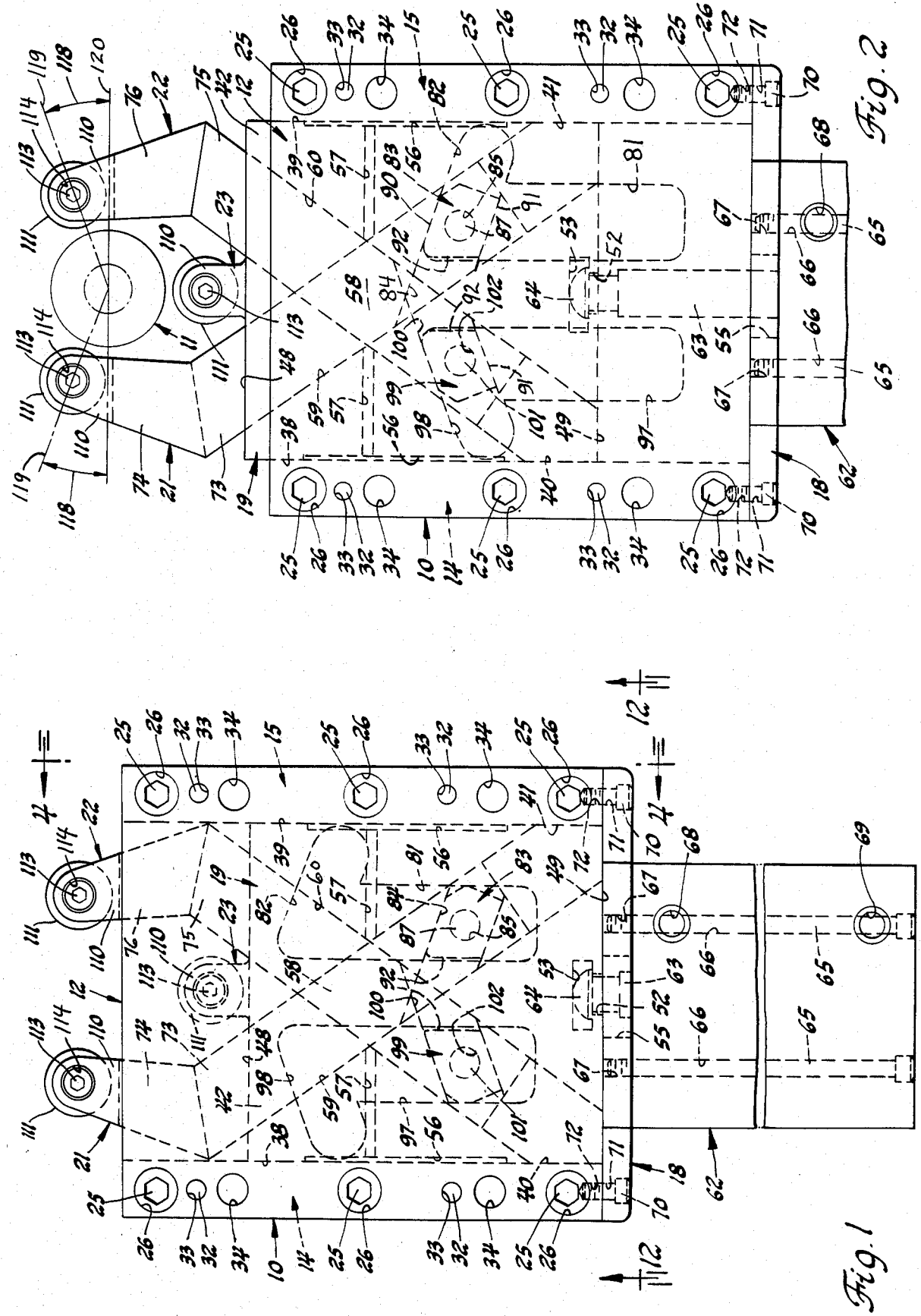

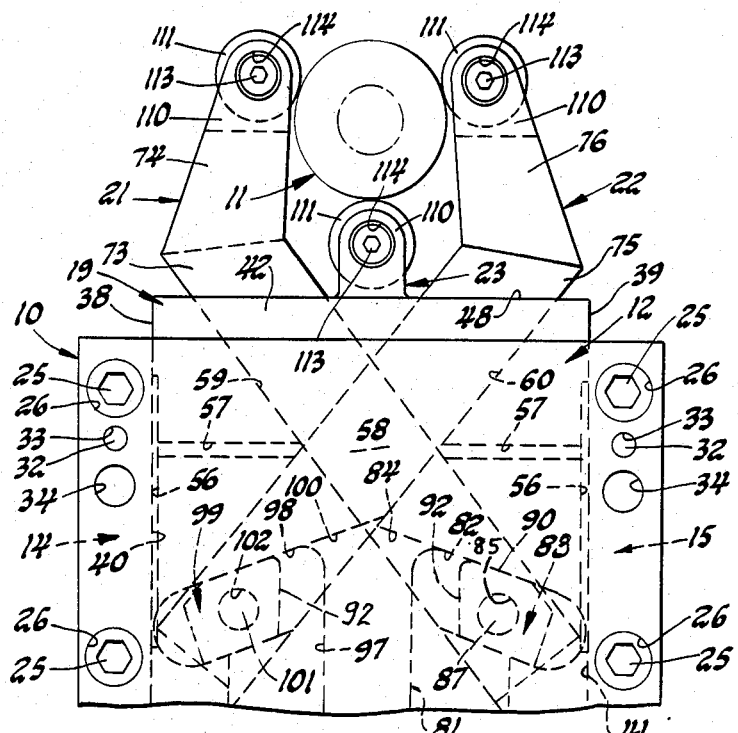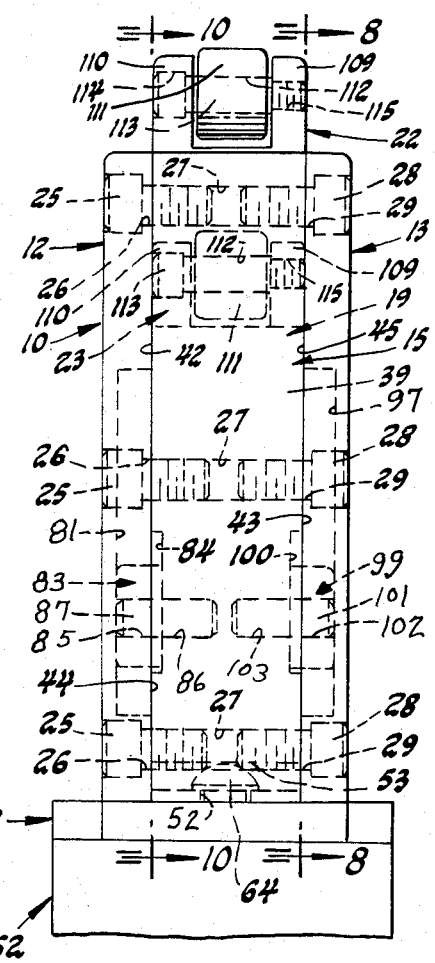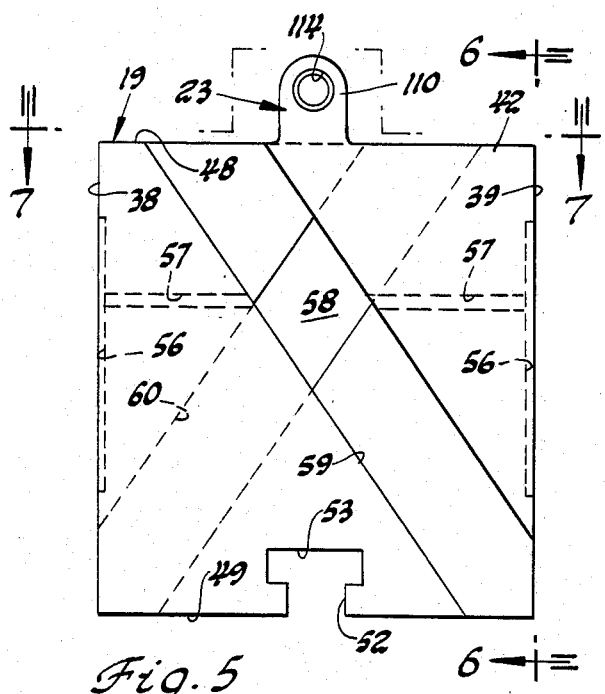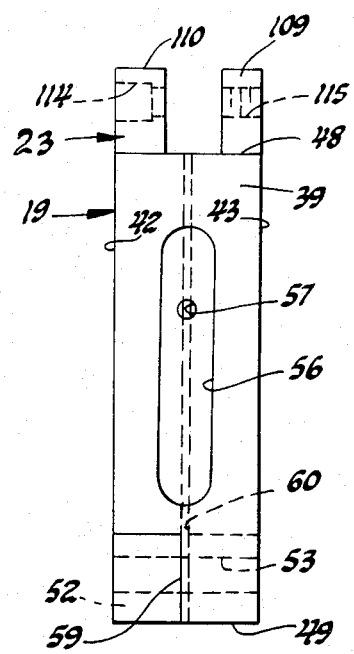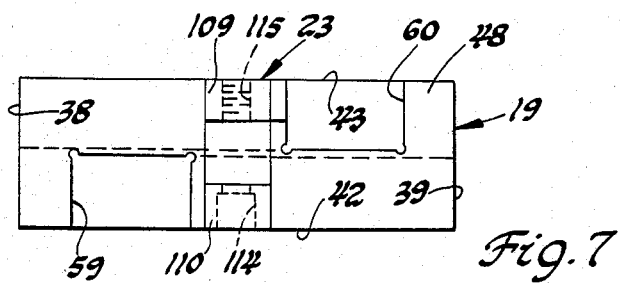

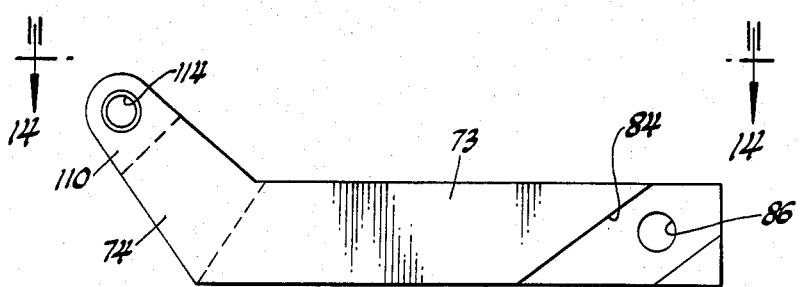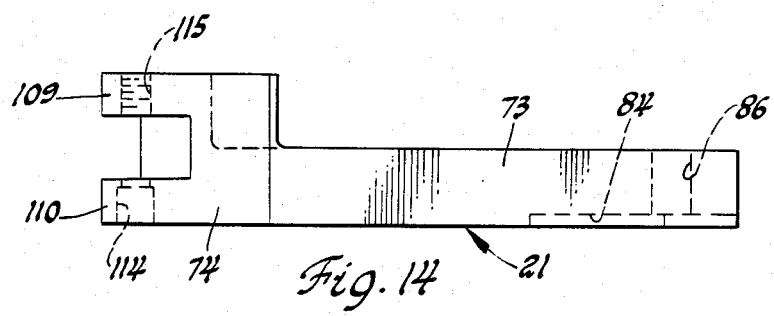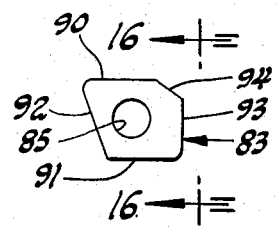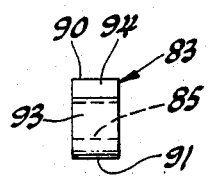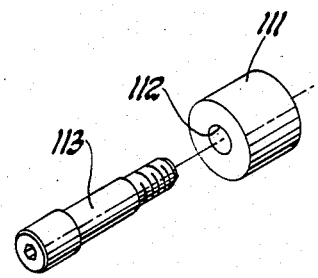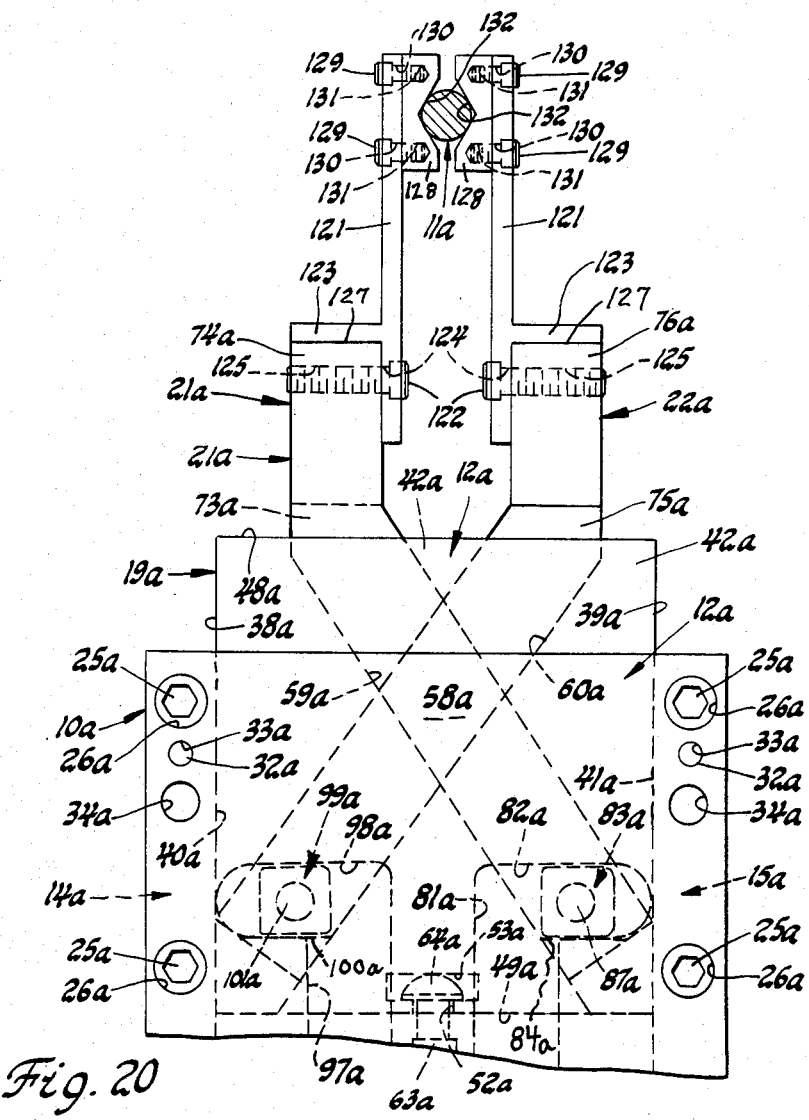

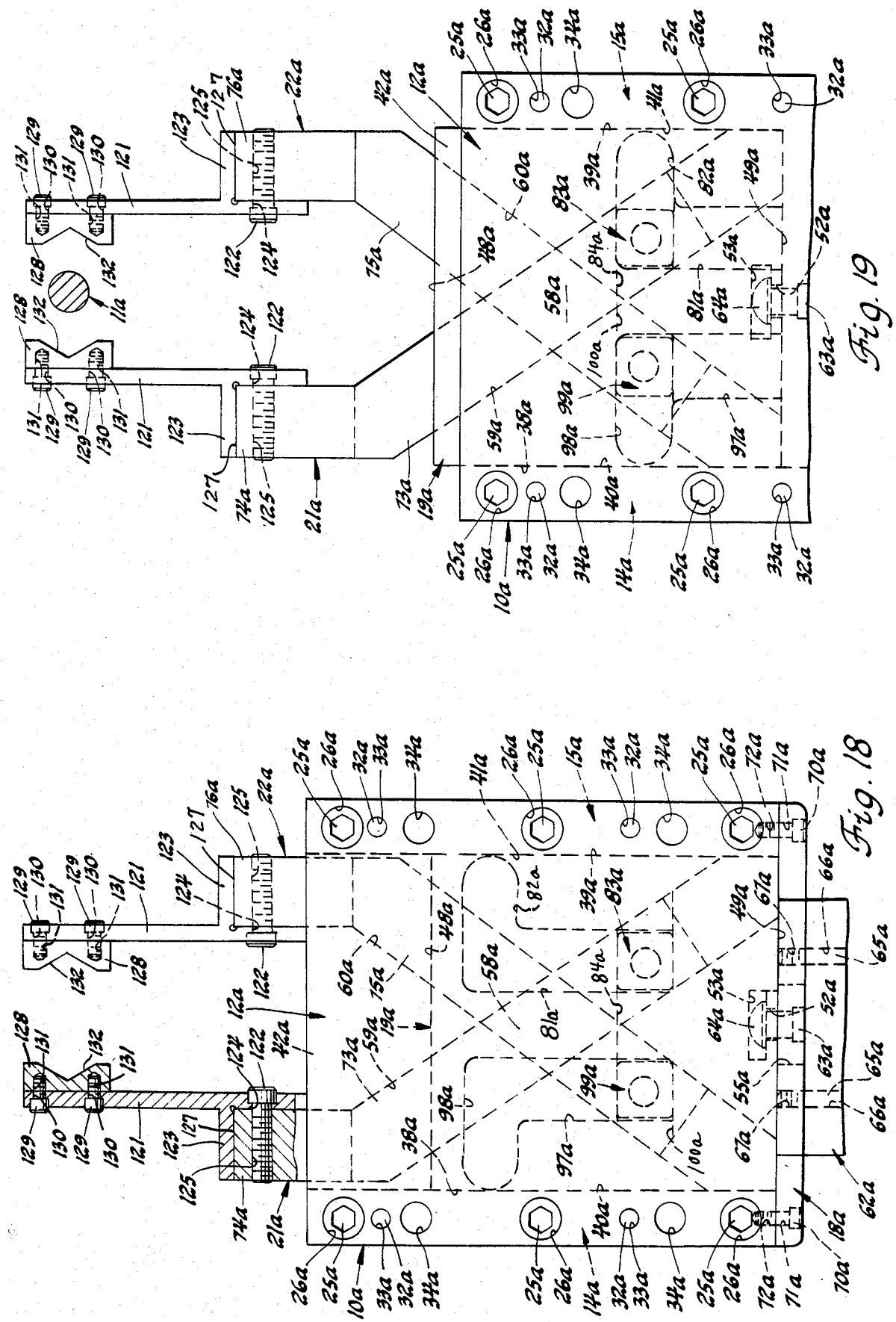

AUTOMATIC CENTERING AND GRIPPER APPARATUS

BACKGROUND OF THE INVENTION

1. Technical Field

The field of art to which this invention pertains may be generally located in the classes of devices relating to gripping devices and steady rests.

2. Background Information

It is known in the machine tool art to employ steady rests for rotatably supporting elongated cylindrical workpieces for abrading and turning operations. It is also known in the robot gripper art to provide gripping devices for moving workpieces between selected positions. However, a disadvantage of such prior art steady rests and gripping devices is that they are limited in their uses, and they are not adapted to carry out both an automatic centering and a workpiece gripping operation.

A disadvantage of the prior art steady rest and gripping devices is that their workpiece engaging members are movable only along one axis, which limits their ability to perform various centering and workpiece gripping operations. A disadvantage of some of the prior art gripping devices is that, although it is advertised that they provide a parallel motion, the gripper arms for such gripping devices move in an arc. Accordingly, if the gripper arms have a V-shaped gripping jaw or finger, then it is necessary to reprogram the controls for the gripping device for each size workpiece, since with different diameters, the V-shaped jaws will be at different positions along the arcuate path through which the gripper jaws are moved, making it necessary to reprogram the gripping device for different diameter workpieces. There are some true parallel motion grippers on the market, but a disadvantage of the last mentioned grippers is that they basically work off a wedge means, which provides only a very short stroke or movement on one axis for their gripping arms. A disadvantage of the last mentioned true parallel grippers is that they cannot be used for a wide range of different diameter workpieces, and accordingly, they lack versatility. It is also known in the prior art to provide a true centering steady rest, having a center wear pad and two side wear pads for movement along only one axis and into supporting engagement with a workpiece, as shown in U.S. Pat. No. 4,399,639.

SUMMARY OF THE INVENTION

In accordance with the present invention, an automatic centering and gripping apparatus is provided which includes a plurality of gripper arms, which are moved along two axes, and which may be provided selectively with either inner or outer diameter gripping jaws or fingers for gripping a workpiece, and centering it, or moving it between selected locations or work positions. The automatic centering and gripping apparatus of the present invention is adapted to hold various size diameter workpieces, without the need for readjusting or reprogramming the controls for the apparatus, and without having to repeatedly find the longitudinal center of a workpiece. The present invention is adaptable to many uses and applications involving the handling, holding or manipulating of workpieces. Particular examples are robot arm grippers, pick and plate units, work holding fixtures or steady rests and gauging heads.

The gripping apparatus of the present invention provides for lateral and longitudinal movement of the gripping jaws for engaging a workpiece, and said apparatus can grip workpieces of small or large diameters without any need for reprogramming the controls for the gripping apparatus, and it also provides high gripping forces for holding a workpiece while it is moved between work positions. In one embodiment, the workpiece engaging gripping jaws or members move in opposing angular lateral gripping paths, to produce a downward as well as a transverse inward or outward gripping force on the workpiece. In another embodiment, the lateral movement of the gripping members toward and away from each other is along the same or parallel linear paths to provide accurate two-dimensional gripping movements, which is especially desirable in work locating or robotic gripper applications.

The automatic centering and gripping apparatus of the present invention is also constructed and arranged so that a plurality of the same can be used in a stacked arrangement, so that the number of movements of the robot necessary to load and unload a workpiece or function as a centering apparatus are at a minimum. The automatic centering and gripping apparatus of the present invention is compact in structure. It can be rotated about its longitudinal axis in a minimum of space, and it also has a flat configuration, so that it can be moved down to a workpiece carrying device, such as a pallet, and pick up a workpiece laying on the pallet, in an efficient manner.

The automatic centering and gripping apparatus of the present invention comprises a housing which includes two side plates, a front cover plate, and a rear cover plate. An operator body is slidably mounted inside of the housing, and it is operatively attached at its bottom end to a power means for moving the operator body longitudinally in the housing. A pair of gripper arms are slidably mounted on the operator body, and they are operatively connected to a cam means, whereby when the operator body is moved longitudinally in a direction outwardly of the housing, toward a workpiece, the gripper arms are first moved longitudinally, and parallel to each other, along the longitudinal axis, outwardly of the housing, and then secondly the gripper arms are moved laterally in a direction either at an acute angle to, or perpendicular to, the longitudinal axis into operative centering or gripping engagement with a workpiece, and when the operator body is moved in a direction inwardly of the housing, or away from the workpiece the gripper arms are retracted from the workpiece to release the same.

BRIEF DESCRIPTION OF THE DRAWINGS

FIG. 1 is a front elevation view of a two-axis, automatic centering and gripping apparatus, such as for example, a robotic gripper, made in accordance with the principles of the present invention, and showing the gripper arms in a workpiece released position.

FIG. 2 is a front elevation view, identical to FIG. 1, but showing the gripper arms moved along one axis to a centering position relative to a workpiece.

FIG. 3 is a front elevation view, identical to FIG. 1, but showing the gripper arms moved to a workpiece engaging position.

FIG. 4 is a right side elevation view of the automatic centering and gripping apparatus structure illustrated in FIG. 1, taken along the line 4—4 thereof, and looking in the direction of the arrows.

FIG. 5 is a front elevation view of the operator body employed in the automatic centering and gripping apparatus illustrated in FIG. 1.

FIG. 6 is a right side elevation view of the operator body structure illustrated in FIG. 5, taken along the line 6—6 thereof, and looking in the direction of the arrows.

FIG. 7 is a top plan view of the operator body structure illustrated in FIG. 5, taken along the line 7—7 thereof, and looking in the direction of the arrows.

FIG. 13 is a side view of one of the two identical gripper arms employed in the gripping apparatus illustrated in FIGS. 1 and 2.

FIG. 14 is a top plan view of the gripper arm structure shown in FIG. 13, taken along the line 14—14 thereof, and looking in the direction of the arrows.

FIG. 15 is an elevation view of one of the cams employed in the automatic centering and gripping apparatus illustrated in FIG. 1.

FIG. 16 is a right side elevation view of the cam structure illustrated in FIG. 15, taken along the line 16-16 thereof, and looking in the direction of the arrows.

FIG. 17 is an exploded view of one of the gripper rollers mounting shaft, employed in the first embodiment of the invention illustrated in FIG. 1.

FIG. 18 is a front elevation view of a second embodiment of the invention, and showing a two-axis, automatic centering and gripping apparatus made in accordance with the principles of the present invention, and showing the gripper arms in a workpiece release position.

FIG. 19 is a front elevation view, identical to FIG. 18, but showing the gripper arms moved along one axis to a centering position relative to a workpiece.

FIG. 20 is a fragmentary, front elevation view, of the structure illustrated in FIG. 18, but showing the gripper arms moved to a workpiece engaging position.

DESCRIPTION OF THE PREFERRED EMBODIMENTS

Figure 8:
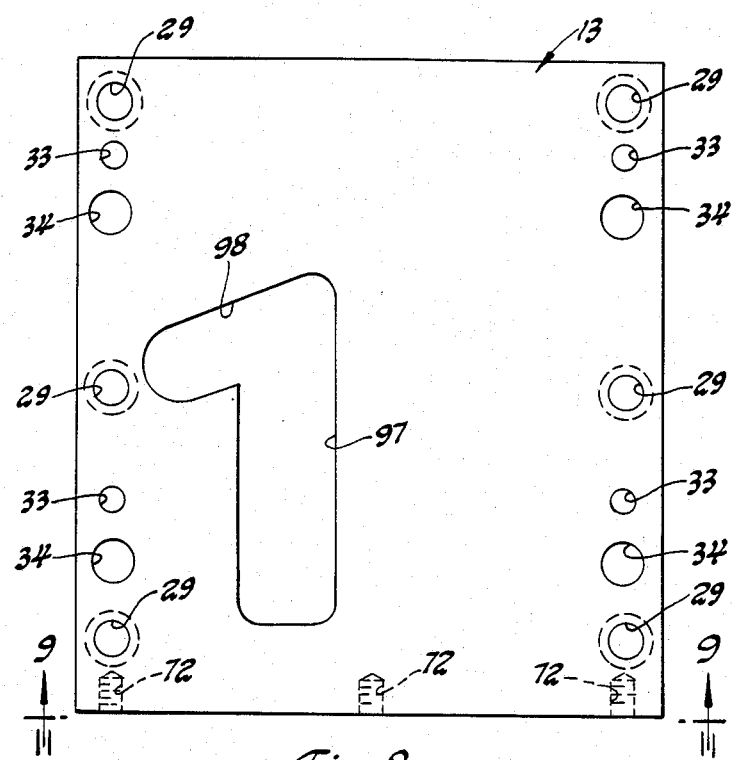
FIG. 8 is an elevation view of the inside surface of the rear cover plate employed in the automatic centering and gripping apparatus illustrated in FIG. 4, taken along the line 8—8 thereof, and looking in the direction of the arrows.

Referring now to the drawings, and in particular to FIGS. 1 and 2, the numeral 10 generally designates an automatic centering and gripping or gripper apparatus made in accordance with the principles of the present invention. The numeral 11 in FIG. 2, generally designates an elongated cylindrical workpiece, as for example an elongated shaft which is to be centered or gripped on the outer diameter thereof, and to have a machining operation performed thereon, or moved between selective work positions or locations. The automatic centering and gripping apparatus may be carried on a conventional robot arm, which in turn may be moved by a conventional robotic power means.

As shown in FIGS. 1 and 4, the automatic centering and gripping apparatus of the present invention includes a housing comprising a front cover plate, generally indicated by the numeral 12, a rear cover plate, generally indicated by the numeral 13 (FIG. 4), and left and right side plates, generally indicated by the numerals 14 and 15, respectively. The numeral 18, generally indicates a bottom end plate, which also functions as a power means or power cylinder mounting plate. The pair of front and rear cover plates 12 and 13 are identically formed, and they are interchangeable. The left and right side plates 14 and 15, respectively, are also identical in structure and are interchangeable. The cover plates 12 and 13, the side plates 14 and 15, and the bottom plate 18, are all made from any suitable material as, for example aluminum.

As best seen in FIGS. 2 and 5, the automatic centering and gripping apparatus 10 includes an operator body, generally indicated by the numeral 19, which is slidably mounted within the aforedescribed housing, and which is made from any suitable material, as for example, aluminum. As shown in FIGS. 1 and 2, the automatic centering and gripping apparatus 10 includes a pair of gripper and centering arms or members, 21 and 22, which are identical in structure, and which are made from any suitable, material, as for example, aluminum. As shown in FIGS. 1 and 2, the operator body 19 is provided with a centrally mounted gripper and centering arm or member, generally indicated by the numeral 23.

As shown in FIGS. 1 and 2, the cover plate 12 is designated as the front cover plate for purposes of describing the structure of the automatic centering and gripping apparatus 10, as it is positioned in the various Figures in the drawings of this application. The right side of the front cover plate 12 is secured to the right side plate 15 by a plurality of suitable cap screws 25, which are mounted through bores 26 formed through the front cover plate 12, and which extend into threaded engagement with threaded bores 27 (FIG. 4) in the right side plate 15. The front cover plate 12 is also connected to the left side plate 14, by a similar plurality of cap screws 25, which pass through bores 26 formed through the left side of the front cover plate 12 and into threaded engagement with threaded bores in the left side plate 14 (not shown) which are the same as the threaded bores 27 in the right side plate 15.

As shown in FIG. 4, the left end of the rear cover plate 13 is secured to the right side cover plate 15 by a plurality of cap screws 28, which are identical to the cap screws 25, and which pass through bores 29 formed through the rear cover plate 13 and into threaded engagement with the threaded bores 27 formed through the right side plate 15. As viewed from the right side of the automatic centering and gripping apparatus, as shown in FIG. 4, the right end of the rear cover plate 13 is also connected by a plurality of cap screws 28 to the rear side of the left side plate 14, in the same manner as the two sides of the front cover plate 12 are secured to the left and right side plates 14 and 15, respectively.

Figure 10:
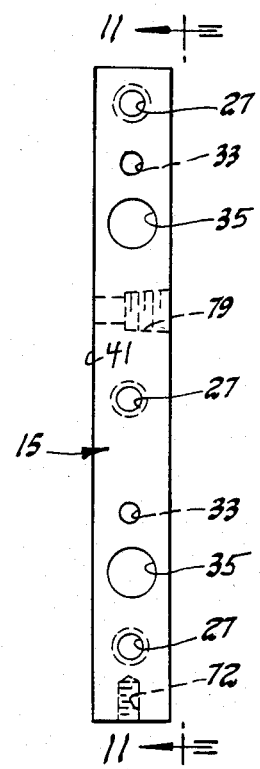
FIG. 10 is a right side elevation view of the automatic centering and gripping apparatus illustrated in FIG. 4, taken along the line 10—10 thereof, looking in the direction of the arrows, and showing the right side plate employed in the automatic centering and gripping apparatus structure of FIG. 1.
Figure 9:
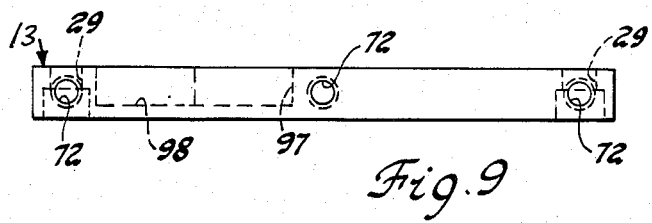
FIG. 9 is a bottom plan view of the rear cover plate illustrated in FIG. 8, taken along the line 9—9 thereof, and looking in the direction of the arrows.
Figure 11:
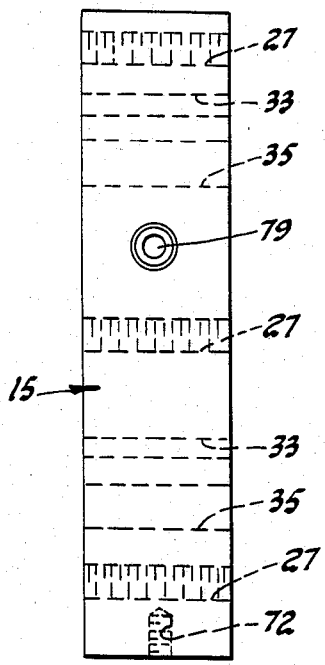
FIG. 11 is a right side elevation view of the right side plate structure illustrated in FIG. 10, taken along the line 11—11 thereof, and looking in the direction of the arrows.

The cover plates 12 and 13 are also joined to the side plates 14 and 15 by a plurality of suitable dowel pins 32, which extend through suitable aligned holes 33, which are formed through the cover plates 12 and 13, and the side plates 14 and 15. As shown in FIGS. 1 and 2, the automatic centering and gripping apparatus 10 is provided with a plurality of mounting holes 34, which are formed through the cover plates 14 and 15, along the left and right sides thereof, and which are aligned with mounting holes 35 that are formed through the side plates 14 and 15, as illustrated in FIGS. 10 and 11.

As shown in FIGS. 1 and 2, the operator body 19 is slidably mounted within the apparatus housing, with its parallel side faces 38 and 39 in slidable contact with the parallel inner faces 40 and 41 on the side plates 14 and 15, respectively. As shown in FIG. 4, the front and rear faces 42 and 43, of the operator body 19 are slidably mounted on the parallel inner faces 44 and 45 of the front and rear cover plates 14 and 15, respectively.

As viewed in FIGS. 1 through 7, it will be seen that the overall configuration of the operator body 19 is rectangular block-shaped, and it has an upper or top end 48 which is parallel to the lower end 49. As best seen in FIG. 5, the lower end 49 of the operator body 19 has formed therein an inwardly extended, T-shaped recess, which is formed by the longitudinal, inwardly extended slot 52 and the communicating transverse slot 53.

As best seen in FIGS. 5 and 6, the operator body 19 is provided on each side thereof with a grease slot 56. The grease slots 56 each communicates with a transverse grease bore 57. The inner ends of the grease bores 57 communicate with a transverse hole 58.

As shown in FIGS. 1, 2 and 5, the operator body 19 is provided with a pair of slide tracks or slots 59 and 60, which are rectangular in cross section. The slots 59 and 60 are disposed on opposite sides of the operator body 19, and they communicate with such other through the transverse hole 58 which is formed through the operator body 19 at the cross-over point of the slots 59 and 60. The slots 59 and 60 are angularly disposed relative to each other, with an acute angle being formed between said slots relative to the longitudinal axis of the operator body 19, above and below the cross-over hole 58. In one embodiment the acute angle relative to the longitudinal axis of the operator body 19 was 70 degrees.

As shown in FIGS. 1 and 8, each of the front and rear cover plates 12 and 13, respectively, are provided along the lower end thereof with a plurality of inwardly extended, threaded bores 72. As illustrated in FIGS. 10 and 11, the right side plate 15 is provided with a threaded bore 72 on the lower end thereof. The left side plate 14 is also provided with a similar threaded bore 72. As shown in FIGS. 1 and 2, the bottom plate or power means mounting plate 18 is secured to the lower end of the apparatus housing by a plurality of suitable cap screws 70, which are mounted through holes 71 (FIG. 12) in the bottom plate 18, and which extend into the threaded bores 72 in the front and rear cover plates 12 and 13, and the left side and right side plates 14 and 15, respectively.

As shown in FIGS. 1 and 2, a power cylinder 62 is operatively mounted on the outer side of the bottom plate 18, by a plurality of suitable cap screws 65 which pass through suitable bores 66, which are formed through the housing of the power cylinder 62, and into threaded engagement with threaded bores 67 (FIG. 12) which are formed in the bottom plate 18. The power cylinder 62 is illustrated as having a square housing and it may be of any suitable type as, for example, it may be a pneumatic or a hydraulic cylinder. The power cylinder 62 is provided with the usual cylinder rod 63, which extends outwardly from the upper end of the cylinder 62, as viewed in FIGS. 1 and 2. The cylinder rod 63 extends through a central bore 55 formed through the bottom plate 18. The cylinder rod 63 is provided with an enlarged head 64, on the outer or upper end thereof. The cylinder rod head 64 is seated in the transverse recess 53 in the lower end of the operator body 19. The cylinder rod 63 extends through the slot 52, and its enlarged head 64 has a flange which is wider than the slot 52 so that the flange seats on the lower wall of the transverse recess 53. The cylinder rod head 64 is slidably mounted sidewise into the transverse recess 53, before the cover plates 12 and 13 are fixedly mounted in place, during assembly of the automatic centering and gripping apparatus.

As shown in FIG. 1, the power cylinder 62 is provided with the usual ports 68 and 69 for attachment to suitable conduits for conveying pressurized fluid, such as air or hydraulic oil, into the power cylinder 62 for operating the cylinder rod 63 between the positions shown in FIGS. 1, 2 and 3. The pressurized fluid admitted into the upper port 68 operates the power cylinder 62 to move the operator body 19 downwardly into the position shown in FIG. 1, to open the gripper arms 21 and 22. The pressurized fluid admitted into the lower port 69 operates the power cylinder 62 to move the cylinder rod 63 upwardly, so as to move the gripper arms 21 and 22 longitudinally outwardly of the apparatus housing, and then sidewardly inward to grip or center a workpiece, such as a workpiece 11, as described in detail hereinafter.

Figure 12:
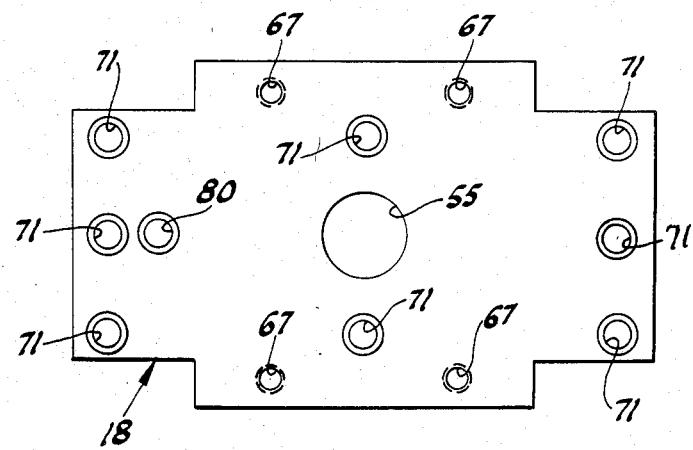
FIG. 12 is a bottom plan view of the power means mounting plate employed in the automatic centering and gripping apparatus illustrated in FIG. 1, taken along the line 12—12 thereof, and looking in the direction of the arrows.

As shown in FIGS. 1, 13 and 14, the gripper arm 21 includes an angular portion 73 and an integral portion 74 which extends longitudinally of the apparatus housing. The angular portion 73 is disposed at an acute angle relative to the longitudinal axis of the operator body 19 and it is slidably mounted in the slide track 59 in the operator body 19. The gripper arm 22 is also provided with an angular portion 75, which is slidably mounted in the slot 60 in the operator body 19. The gripper arm 22 is also provided with an integral longitudinal portion 76. As shown in FIGS. 10 and 11, the right side plate 15 is provided with a grease fitting 79 for inserting grease into the slots 56, the bores 57, and the transverse opening 58, for lubricating the operator body 19 in its movement within the apparatus housing. As shown in FIG. 12, a threaded pipe fitting hole 80 is formed through the bottom plate 18 to provide a second grease inlet position for inserting grease into the apparatus housing.

As shown in FIGS. 1 and 2, the front cover plate 12 is provided with a longitudinally extended cam slot 81, which is disposed on the right side of the longitudinal axis of the apparatus housing, as viewed in FIG. 1. A transverse cam slot 82 is formed in the front cover plate 12 on the inner side thereof. The transverse cam slot 82 has its inner end in communication with the end of the longitudinal cam slot 81 which is disposed toward the upper end of the apparatus housing. As viewed in FIG. 1, the transverse cam slot 82 is angularly disposed, and it slopes outwardly and downwardly at an acute angle relative to the longitudinal axis of the apparatus housing, and it terminates adjacent the right side plate 15. A slider shoe cam, generally indicated by the numeral 83, is mounted in an angular slot 84 (FIG. 13) which is formed in the lower end portion 73 of the gripper 21. The slot 84 is disposed at an angle which is parallel to the angle of the transverse cam slot 82. The slider shoe cam 83 has a bore 85 formed therethrough in which is slidably received one end of a dowel pin 87. As shown in FIG. 4, the inner end of the dowel pin 87 is fixedly mounted as by a press fit in a bore 86 in the gripper arm portion 73. As shown in FIG. 4, the slider shoe cam 83 has a portion that is slidably mounted in the vertical or longitudinally extended cam slot 81.

As shown in FIG. 15, the slider shoe cam 83 has a top end 90 and a bottom end 91. The inner side of the slider shoe cam 83 is indicated by the numeral 92, and the right or outer side is indicated by the numeral 93. The corner between the top end 90 and the right side 93 is chamfered or relieved, and comprises an angular corner portion indicated by the numeral 94.

As shown in FIGS. 1, 4 and 8, the rear cover plate 13 is provided with a longitudinally extended cam slot 97, which is disposed on the left side of the longitudinal axis of the apparatus housing, and in a position parallel to the cam slot 81. The upper end of the cam slot 97 communicates with a lateral angular cam slot 98, which has its inner end in communication with the upper end of the cam slot 97, and its outer end terminating adjacent to the left side plate 14. The cam slots 82 and 98 each are disposed at an acute angle relative to the longitudinal axis of the apparatus housing. The last mentioned acute angle is approximately a 20 degree angle. A slider shoe cam, generally indicated by the numeral 99, is disposed in an angular slot 100 which is formed in the inner face of the vertical portion 75 of the gripper arm 22, and at the same angle as the angle of the cam slot 98. The slider shoe cam 99 is shaped in the same manner as the first described slider shoe cam 83, and the various sides thereof, may be viewed as numbered in the same manner as the cam 83 in FIG. 15. The slider shoe cam 99 is reversed in position, so that the sides 92 of the slider shoe cams 83 and 99 are disposed facing each other, and disposed for sliding movement along the inner faces of the longitudinal cam slots 81 and 97.

The slider shoe cam 99 is provided with a transverse bore 102 in which is rotatably mounted one end of a dowel pin 101. The other end of the dowel pin 101 is fixedly mounted, as by a press fit, in a transverse hole 103 (FIG. 4), formed in the inner end of the vertical portion 75 of the gripper arm 22. As shown in FIG. 4, the slider shoe cam 99 is slidably mounted in the longitudinal cam slot 97.

As shown in FIGS. 1 and 2, each of the gripper arms 21 and 22, and the gripper member 23, are provided with a workpiece engaging roller 111. As shown in FIGS. 13 and 14, the gripper arm 21 has a pair of integral roller holder or support arms 109 and 110, integrally mounted on the outer end of the longitudinal portion 74. The roller support arm 110 has a stepped opening 114 formed therethrough, which is aligned with a threaded bore 115 that is formed through the other roller support arm 109. As shown in FIG. 17, each of the rollers 111 is provided with an axial hole 112 formed therethrough for the reception of a roller support shaft 113. As shown in FIG. 4, the gripper arm 22 is provided with the same roller support arms 109 and 110. FIG. 4 illustrates how each of the the roller support shafts 113 is operatively mounted between the two roller support arms 109 and 110, to rollably support the roller 111 on each of the gripper arms 21 and 22. FIGS. 5 through 7 illustrate the roller support arms 109 and 110 as they are integrally mounted on the operator body 19. FIGS. 1, 2 and 3 show the operator body workpiece gripper 23 being provided with a roller 111, which is held in place between roller supports 109 and 110 by a roller support shaft 113.

In use, the automatic centering and gripping apparatus 10 would be operatively mounted on a conventional robotic arm or similar structure, for moving said apparatus or holding it in place, as desired. In order to grip a workpiece such as a workpiece 11, pressurized fluid is admitted into the lower port 69, for operating the power cylinder 62 in an upward direction so as to move the operator body 19 upwardly, to the position shown in FIG. 2. The initial movement of the operator body 19 is from the retracted inoperative position shown in FIG. 1 through a longitudinal extension movement comprising a first portion and a second portion to the advanced operative centering and gripping position shown in FIG. 2. It will be seen from FIGS. 1 and 2, that when the operator body 10 is moved upwardly, as shown in FIGS. 1 and 2, that the slide shoe cams 83 and 99 will be moved upwardly in the cam slots 81 and 97, respectively, and that the gripper arms 21 and 22 will move longitudinally in a straight line, through a first portion of the longitudinal extension movement, to move the rollers 111 carried thereon from the positions shown in FIG. 1 to the positions shown in FIG. 2, and without an axial movement of the gripper arms 21 and 22 relative to the operator body longitudinal axis. Continued movement of the operator body 19 to the position shown in FIG. 3 causes the gripper arms 21 and 22 to be moved, through a second portion of the longitudinal extension movement, in a combination longitudinal rearward and transverse inward movement along the radii lines 119, as shown in FIG. 2, to a point where rollers 111 on the gripper arms 21 and 22 engage the workpiece 11. Simultaneously, the roller 111 on the workpiece gripper 23, engages the workpiece 11 on the longitudinal center line of the apparatus, which extends through the center of the workpiece 11. The angle from horizontal line 120 through the center line of the workpiece 11, and to each of the radii lines 119 passing through the center of the roller support shafts 113 and the center line of the workpiece 11, for both of the rollers 111 on the gripper arms 21 and 22, is indicated by the numeral 118. The angle 118 is the same angle as the acute angle of the cam slots 82 and 98, and in one embodiment it was a 20 degree angle.

It will be seen that the embodiment of FIGS. 1 through 17 provides a three point workpiece engaging apparatus, which can be used as s workpiece centering apparatus for holding a workpiece 11 while a manufacturing operation is performed thereon, or the apparatus 10 can be used as a three point robotic gripper apparatus for gripping a workpiece 11, and moving it from one work position to another, or the apparatus 10 can be used to first carry out a centering function and then a workpiece gripper function for moving a workpiece from one location to another. It will be understood that the pressure of the rollers 111 on the workpiece 11, for selectively carrying out a centering or a robotic clamping operation, is determined by the pressure exerted by the power cylinder 62, and that such pressure can be constant or it can be varied, in accordance with the centering or clamping requirements of a desired operation.

In order to release the workpiece 11, the pressurized fluid is exhausted from the power cylinder port 69 and pressurized fluid is admitted into the port 68 to move the operator body 19 downwardly, as viewed in FIGS. 1 through 3, or inwardly of the apparatus housing through a longitudinal retraction movement back to the retracted inoperative position. The longitudinal retraction movement which includes a first portion which reverses the movement of the cams 83 and 99, from the position shown in FIG. 3 to the position shown in FIG. 2, so as to disengage the rollers 111 from the workpiece 11. The roller 111 on the workpiece engaging member 23 on the operator body 19 is moved downwardly on the longitudinal axis of the operator body 19, while the rollers 111 on the gripper arms 21 and 22 are moved outwardly and upwardly from the workpiece 11 along the radii lines 119 (FIG. 2) to move the gripper arms 21 and 22 in a combined longitudinal and lateral movement. continuation of the longitudinal inward retraction movement of the operator body 19 into the apparatus housing through a second portion of the retraction movement. Moves the cams 83 and 99 downwardly in the longitudinal cam slots 81 and 97, respectively, so as to move the gripper arms 21 and 22, and the gripping rollers 111 back to the retracted positions shown in FIG. 1 with the gripper arms 21 and 22 restrained against movement relative to the operator body.

It will be understood that other types of workpiece engaging members may be substituted for the rollers 111 for engagement with workpieces having cross sections which are other than circular. It will also be understood that the angles 118 can be dissimilar if it is desired to move the rollers 111, on the gripper arms 21 and 22, at different angular paths between the positions shown in FIGS. 2 and 3. This action would be accomplished by disposing the cam slots 82 and 98 at different acute angles.

FIGS. 18, 19 and 20 illustrate a second embodiment of the invention, and the parts thereof, which are the same as the parts of the first embodiment illustrated in FIGS. 1 through 17, are marked with the same reference numerals followed by the small letter "a".

The second embodiment of FIGS. 18 through 20 is a two point workpiece engaging apparatus. In the embodiment of FIGS. 18 through 20 the transverse cam slots 82a and 98a are formed at right angles to the longitudinal cam slots 81a and 97a, whereby the transverse movement of the gripper arms 21a and 22a are along the same linear path, so as to provide true parallel movement of the workpiece engaging jaws 128 with the illustrated workpiece 11a.

As shown in FIGS. 18 through 20, each of the gripper arms 21a and 22a have operatively mounted thereon a gripper jaw 128. Each of the gripper jaws 128 is carried on a mounting arm 121 which is releasably secured to the longitudinal gripper arm portions 74a and 76a by a pair of laterally spaced apart machine screws 122. The machine screws 122 are slidably mounted through bores 124 which are formed through the lower end of each of the mounting arms 121, and they are extended into threaded engagement with threaded bores 125 that are formed through the gripper arm portions 74a and 76a. The mounting arms 121 have an integral, outwardly extended, perpendicular flange 123, which rests on the upper ends 127 of the gripping arm portions 74a and 76a.

The gripper jaws 128 are releasably secured to the outer ends of the mounting arms 121 by a pair of suitable machine screws 129, which are slidably mounted through bores 130 formed through the upper ends of the mounting arms 121 and into threaded engagement with threaded bores 131, which are formed in the outer side of the gripper jaws 128. Each of the gripper jaws 128 is shown as being provided with a V-shaped seat 132 for engagement with the rounded outer surface of the illustrative cylindrical workpiece 11a. The gripper jaws 128 may be mounted on the outer sides of the mounting arms 121 for gripping engagement with the inner diameter of a workpiece.

In use, when the power means 62a is operated to move the operator body 19a upwardly from the position shown in FIG. 18, the slider shoe cams 83a and 99a are moved upwardly in the cam slots 81a and 87a, respectively, so as to move the gripper arms 21a and 22a longitudinally outward, or upwardly from the apparatus housing as viewed in FIGS. 18 and 19, and to the positions shown in FIG. 19. Continued longitudinal movement of the gripper arms 21a and 22a to the positions shown in FIG. 19 occurs when the slider shoe cams 83a and 99a engage the upper sides of the transverse cam slots 82a and 98a. Continued upward movement of the operator body 19a moves the cams 83a and 99a transversely outward in their respective cam slots 82a and 98a, until they reach the positions shown in FIG. 20, at which point the gripper jaws 128a engage the cylindrical workpiece 11a.

The pressure exerted on the workpiece 11a is controlled by the pressure exerted by the power means 62a. Accordingly, the gripper jaws 128a can be pressed against the workpiece 11a with a light force to permit the workpiece 11a to be rotated within the jaws 128a for a centering and manufacturing operation, after which the gripper jaws 128a can be pressed against the workpiece 11a with a stronger force so as to rip the same for robotic moving of the workpiece 11a to a new location, or manufacturing position, where it can be released. The workpiece 11a would be released by operating the power cylinder 62a to move the operator body 19a in the reverse manner, so as to move the gripper arms 21a and 22a transversely back, or outward, to the open position shown in FIG. 19. In the last mentioned retraction movement the slider shoe cams 83a and 99a are moved transversely inward to a point where they engage the inner side surfaces of the cam slots 81a and 97a, and continued movement of the operator body 19a inwardly of the apparatus housing moves the slider shoe cams 83a and 99a downwardly through the cam slots 81a and 97a, respectively, to the initial position shown in FIG. 18. If the gripper jaws 128a are mounted on the outer sides of the mounting arms 121a, for an inner diameter workpiece engaging operation, then the gripper arms 21a and 22a would be initially placed in a position similar to the position shown in FIG. 20, and then they would be moved transversely outward to a position shown in FIG. 19, for engaging the internal diameter of a cylindrical workpiece, and the like.

What is claimed is:

1. An automatic centering and gripping apparatus, characterized in that it comprises:
   (a) a housing having a longitudinal and a transverse axis;
   (b) an operator body, having a longitudinal and a transverse axis, and further having a pair of opposite side faces and a front face and a rear face, slidably mounted in said housing for a longitudinal extension movement to an operative centering and gripping position in said housing from a retracted inoperative position, and for a longitudinal retraction movement in said housing from said operative centering and gripping position back to said retracted inoperative position, and each of said longitudinal extension and retraction movements including first and second portions thereof;

(c) a pair of gripper arms slidably mounted in a pair of angled gripper arm slots which are disposed in a criss-cross manner, and which are formed in said operator body, with one gripper arm slot being formed in the front face of the operator body, and the other gripper arm slot being formed in the rear face of the operator body;

(d) said gripper arms each carrying a workpiece gripper member for centering and gripping engagement with a workpiece;

(e) cam means for restraining each of said gripper arms against movement relative to the operator body axially of the longitudinal axis of the operator body during movement of the operator body, through the first portion of said longitudinal extension movement of the operator body, and through the second portion of said longitudinal retraction movement of the operator body but which permits a combination longitudinal and lateral movement of the gripper arms relative to the longitudinal axis of said operator body during movement of the operator body, through the second portion of said longitudinal extension movement of the operator body, and through the first portion of said longitudinal retraction movement of the operator body, toward and away from a workpiece whereby the workpiece gripper members carried by the gripper arms are moved along opposing lateral travel paths; and, (f) means for moving said operator body longitudinally in said housing, whereby when said operator body is moved in said longitudinal extension movement, the workpiece gripper members on the gripper arms are moved along travel paths longitudinally and laterally of the housing and into gripping engagement with a workpiece, and when the operator body is moved in said longitudinal retraction movement, the workpiece gripper members are retracted from the workpiece along the same travel paths.

2. An automatic centering and gripping apparatus as defined in claim 1, characterized in that said housing comprises:
(a) a front cover plate; and,
(b) a rear cover plate.

3. An automatic centering and gripping apparatus, as defined in claim 2, characterized in that and comprising, said gripper arm slots each being disposed at an acute angle relative to the longitudinal axes of the housing and operator body, with each gripper arm slot being disposed with its upper end on one side of said longitudinal axes.

4. An automatic centering and gripping apparatus, as defined in claim 3, characterized in that and comprising, power means for moving said operator body.

5. An automatic centering and gripping apparatus, characterized in that it comprises:
(a) a housing having a longitudinal and a transverse axis;
(b) an operator body, having a longitudinal and a transverse axis, and further having a pair of opposite side faces and a front face and a rear face, slidably mounted in said housing for a longitudinal extension movement to an operative centering and gripping position in said housing, from a retracted inoperative position, and for a longitudinal retraction movement in said housing from said operative centering and gripping position back to said retracted inoperative position, and each of said longitudinal extension and retraction movements including first and second portions thereof;

(c) a pair of gripper arms slidably mounted in a pair of angled gripper arm slots which are disposed in a criss-cross manner, and which are formed in said operator body, with one gripper arm slot being formed in the front face of the operator body, and the other gripper arm slot being formed in the rear face of the operator body;

(d) said gripper arms each carrying a workpiece gripper member for centering and gripping engagement with a workpiece;

(e) cam means for restraining each of said gripper arms against movement relative to the operator body axially of the longitudinal axis of the operator body during mvement of the operator body, through the first portion of said longitudinal extension movement of the operator body, and through the second portion of said longitudinal retraction movement of the operator body, but which permits a combination longitudinal and lateral movement of the gripper amrs relative to the longitudinal axis of said operator body during movement of the operator body, through the second portion of said longitudinal extension movement of the operator body, and through the first portion of said longitudinal retraction movement of the operator body, toward and away from a workpiece whereby the workpiece gripper members carried by the gripper arms are moved along opposing lateral travel paths;

(f) means for moving said operator body longitudinally in said housing, whereby when said operator body is moved in said longitudinal extension movement, the workpiece gripper members on the gripper arms are moved along travel paths longitudinally and laterally of the housing and into gripping engagement with a workpiece, and when the operator body is moved in said longitudinal retraction movement, the workpiece gripper members are retracted from the workpiece along the same travel paths;

(g) said housing comprising a front cover plate and a rear cover plate;

(h) a pair of gripper arm slots, each being disposed at an acute angle relative to the longitudinal axes of the housing and operator body, with each gripper arm slot being disposed with its upper end on one side of said longitudinal axes;

(i) power means for moving said operator body;

(j) a first cam slot formed in one cover plate and having a longitudinal portion, and a lateral portion communicating with one end of the longitudinal portion, relative to the longitudinal and transverse axes of the apparatus housing, and a slider shoe cam slidably mounted in said first cam slot and being attached to a first one of said gripper amrs; and, (k) a second cam slot formed in the other cover plate and having a longitudinal portion, and a lateral portion communicating with one end of the longitudinal portion, relative to the longitudinal and transverse axes of the apparatus housing, and a slider shoe cam slidably mounted in said second cam slot and being attached to a second one of said gripper arms.

6. An automatic centering and gripping apparatus, as defined in claim 5, characterized in that and comprising:
   (a) the lateral portions of the first and second cam slots extending laterally from their respective longitudinal slot portions, in opposite lateral acute angular directions, toward the other ends of their respective longitudinal portions; and,
   (b) the lateral movements of the gripper arms relative to the longitudinal axis of said operator body toward and away from a workpiece being upon angular paths parallel to the respective first and second cam angular lateral slot portions, so as to move the workpiece gripper members carried by the gripper arms in opposing angular lateral travle paths for gripping engagement with a workpiece.

7. An automatic centering and gripping apparatus, as defined in claim 6, characterized in that and comprising, workpiece gripper members which comprise rollers.

8. An automatic centering and gripping apparatus, as defined in claim 7, characterized in that and comprising, an operator body carrying a third workpiece engaging roller for engaging a workpiece at a third point when the rollers on the gripper arms engage a workpiece at two other points, so that the workpiece is engaged at three circumferentially spaced apart points on the workpiece.

9. An automatic centering and gripping apparatus, as defined in claim 5, characterized in that and comprising:
   (a) the lateral portions of the first and second cam slots extending transversely from their respective longitudinal slot portions, in opposite transverse rectangular directions, outwardly away from the longitudinal axes of the housing and operator body; and
   (b) the lateral movements of the gripper arms relative to the longitudinal axis of the housing and operator body, toward and away from a workpiece, being upon paths which are at right angles to the housing and operator body longitudinal axes, so as to move the workpiece gripper members carried by the gripper arms in parallel, transverse travel paths, for gripping engagement with a workpiece at two opposite points.

10. An automatic centering and gripping apparatus, as defined in claim 9, characterized in that and comprising, workpiece gripper members which comprise gripper jaws.

* * * * *